(No Model.)

F. W. SARGENT.
CAR COUPLING.

No. 502,532. Patented Aug. 1, 1893.

Witnesses.
Geo. P. Sheridan.
Samuel E. Hibben.

Inventor.
Fitz William Sargent.
Banning and Banning and Payson.
Attorneys.

UNITED STATES PATENT OFFICE.

FITZ WILLIAM SARGENT, OF CHICAGO, ILLINOIS, ASSIGNOR TO THE CONGDON BRAKE SHOE COMPANY, OF SAME PLACE.

CAR-COUPLING.

SPECIFICATION forming part of Letters Patent No. 502,532, dated August 1, 1893.

Application filed July 18, 1892. Serial No. 440,348. (No model.)

*To all whom it may concern:*

Be it known that I, FITZ WILLIAM SARGENT, a citizen of the United States, residing at Chicago, Illinois, have invented certain new and useful Improvements in Automatic Couplers, of which the following is a specification.

My invention is intended to be an improvement upon the automatic coupler described and claimed in the application of David L. Barnes, Serial No. 419,889, filed February 1, 1892; and my improvement consists in the features and details of construction hereinafter described and claimed.

Figure 1:
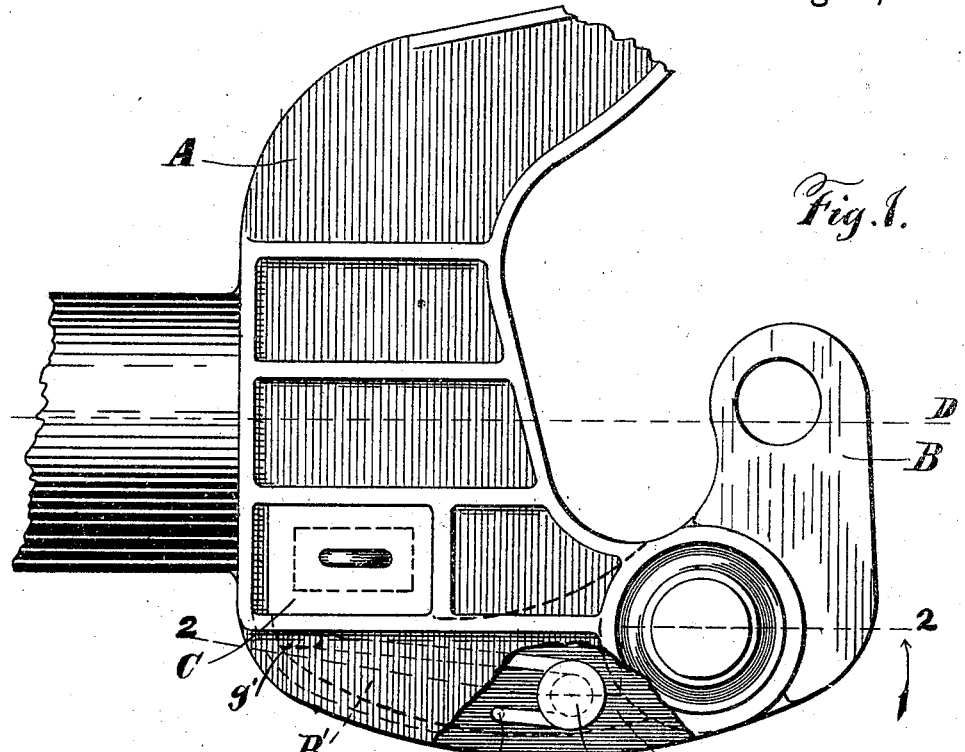
Figure 2:
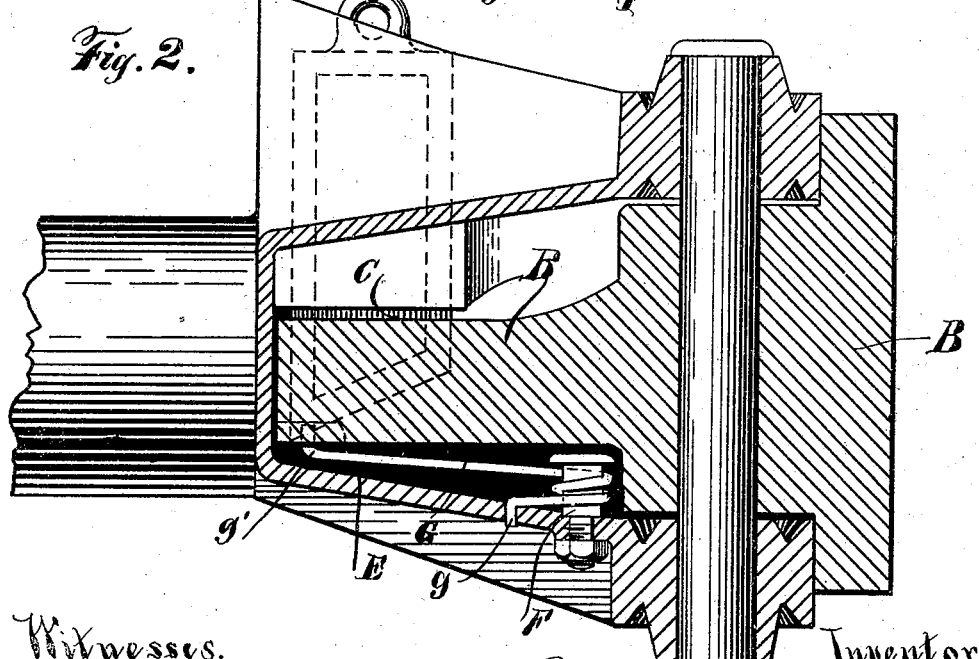

In the drawings, Figure 1 is a plan view of an automatic car coupler containing my improvement; and Fig. 2 is a side elevation of a section taken in the line 2 of Fig. 1 looking in the direction of the arrow.

In automatic car couplers, as is well known, it is desirable that the knuckle or hook should be provided with means to automatically throw and hold it in a position of openness when the coupling pin is lifted, to permit the coupling of cars together. Various means have been employed for this purpose, but for various reasons they have proved unsatisfactory and objectionable in use. I propose by my present invention to provide means which shall be free from the objection that has developed in the use of other appliances for the same purpose.

In making my improvement, I take a car coupler, preferably of the kind shown in the drawings and described in the specification of the Barnes application referred to, comprising a head, A, and a knuckle or hook B, with a knuckle arm B', extending back into a position to contact or rest against a coupling pin C, when the knuckle is in its locked or operative position. I have shown the knuckle in its locked position in Fig. 1, with the knuckle arm resting against the coupling pin, which prevents the knuckle from turning or rotating out of engagement with the knuckle or hook of the car with which it is coupled under the stress of work.

When the coupler is intended to be connected with another one, the coupling pin is lifted, and the hook or knuckle is rotated or thrown back to one side of the center line D, so that the knuckle or hook of another coupler, also thrown outside of its center line, may pass into the recess in the head to be engaged or locked in position. This rotating of the knuckle or hook, to permit coupling, should be done automatically, so that there will be no necessity of the attendant entering between the cars as they come together. To do this, I provide a recess E, immediately under the knuckle arm, so that the recess will be inclosed by it and the walls of the coupler head. I arrange a bolt or stud, F, in this recess, of a desired size and height, and arrange around it a coiled spring G. One end $g$ of this spring is passed into a hole in the coupler head, or secured to the coupler head in any other desired manner, or otherwise fastened, so that the wire composing the spring may be coiled around the stud a desired number of times, without slipping or rotating the stud, and the other end of the spring wire $g'$ is carried into a hole or slot in the knuckle arm, or otherwise secured to it, so that it will remain in constant engagement with it. As the coupling pin is lifted, the tension of the spring G is such, that, as it bears against the knuckle arm, through its member $g'$, it moves the knuckle arm so as to rotate the knuckle and move its hook or coupling portion out beyond the center line to permit the insertion of the hook of another coupler. All that is necessary, therefore, to secure the rotation of the knuckle into the proper position for coupling, is to lift the coupling pin, when the spring by its tension will automatically throw the knuckle into the desired position. As the coupling heads come together in coupling, the knuckles will be moved into their locking position, and the knuckle arms moved out against the tension of the spring until the coupling pin drops into place, when the knuckle will be locked in its working or operative position.

Should the spring become broken, it will not, owing to its position, interfere in any way with the locking or unlocking of the knuckles or hooks of the couplers, and, owing to its location, arrangement, and method of fastening, a broken spring may easily be removed and a new one substituted in its place.

What I regard as new, and desire to secure by Letters Patent, is—

In a car coupling, the combination of a coupler head, a rotatable knuckle or hook arranged therein provided with a knuckle arm, a vertically sliding locking pin provided with a beveled end beneath which the knuckle arm passes in locking, and a coil spring arranged in the recess beneath the knuckle arm and the bottom plate of the coupler head, having one end engaging with the coupler head through the instrumentality of a stud situated as near as practicable to the pivotal point of the knuckle, and the other end having a sliding engagement with the extreme end of the knuckle arm, substantially as described.

FITZ WILLIAM SARGENT.

Witnesses:
   CHRS. F. SHERIDAN,
   SAMUEL E. HIBBEN.